Feb. 26, 1946. J. M. SUMMERS 2,395,695
WATER AND GAS PROOF SEPARABLE FASTENER
Filed June 5, 1943
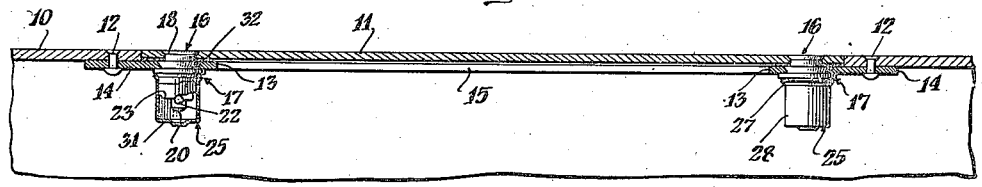
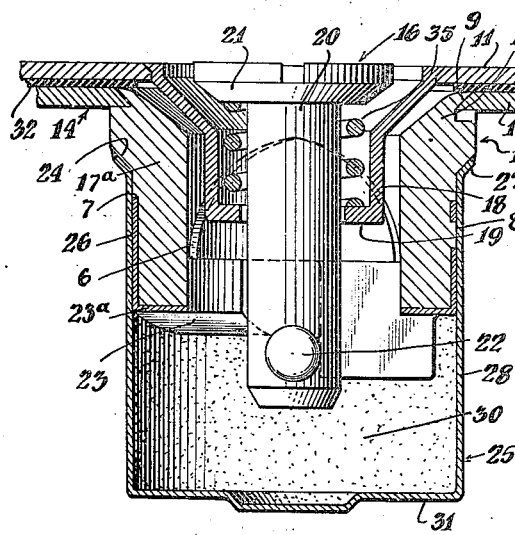
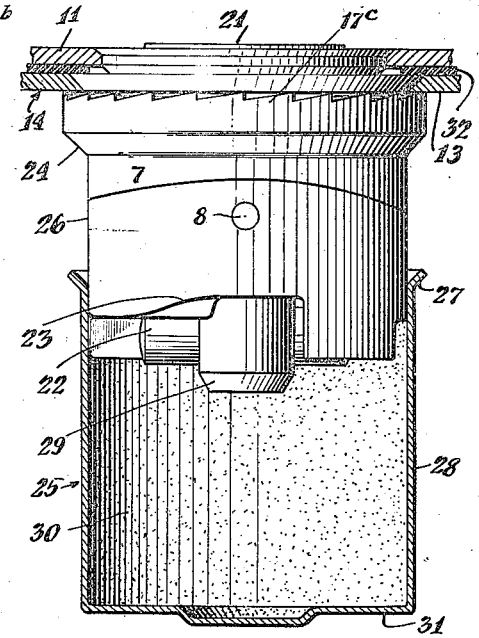
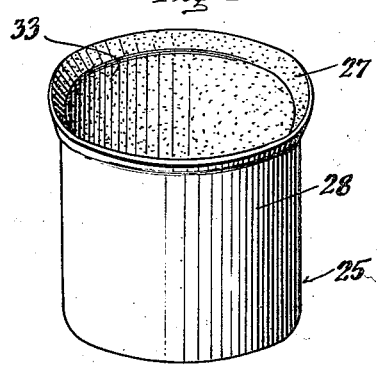
INVENTOR.
J Mills Summers
BY
ATTORNEYS Patented Feb. 26, 1946

2,395,695

UNITED STATES PATENT OFFICE 2,395,695

WATER AND GAS PROOF SEPARABLE FASTENER

J Mills Summers, Englewood, N. J., assignor to Camloc Fastener Corporation, New York, N. Y., a corporation of New York Application June 5, 1943, Serial No. 489,753

3 Claims. (Cl. 24—221)

This invention relates to an improved separable fastener adaptable specifically to installations wherein fasteners of a liquid or gas proof type are desirable. Hereinafter such fasteners will sometimes be referred to as sealed or seal type fasteners.

The invention as illustrated is shown applied to fasteners generally referred to as rotatable separable stud fasteners in which the fastener comprises generally two parts—first, a rotatable stud assembly which is fastened to one part which it is desired to secure, for example, a removable inspection plate, and, second, a socket part which is fastened or secured to another part of the structure and which is engageable by a projecting portion of the stud assembly.

In practical application, fasteners of this type have found numerous uses in connection with securing of airplane inspection plates, cowlings, and similar parts.

It should be pointed out that these fasteners are frequently used in positions, for example, on the pontoons of flying boats and similar places and in which it is desirable to have the installation substantially water tight. In some installations, the fastener may be used in connection with tanks or receptacles for holding fluids or gases in which it is important to prevent the contents of the tank from leaking out. Further, and as will be readily understood, airplane cabins are at times maintained under pressure greater than that of the outside. At such times it is important to have removable plates secured by fasteners constructed to hold the desired pressure.

In solving this general problem of providing a sealed fastener, the present invention has fulfilled a definite need in the art.

It is an object of the invention to provide such a sealed fastener which may be readily installed with a minimum of effort and time.

It is a further object to provide such a fastener readily capable of mass production.

A further object is the provision of such a fastener which may be made liquid and gas tight without the use of installation tools of any kind and by unskilled labor.

Referring now to the drawing, we observe one type of rotatable separable stud fastener embodying this invention. It is, however, pointed out that various different rotatable stud assemblies may be resorted to without in any manner departing from the scope of this invention.

Fig. 1 is a cross sectional view of the top of a hull portion of a flying boat illustrating one manner in which the fasteners of the present invention are used.

Fig. 2 is a cross sectional view of the fastener in completely installed position.

Fig. 3 is a cross sectional view of the fastener during assembly.

Fig. 4 is a perspective view of the cap portion of the fastener.

Referring now to Fig. 1, we observe one type of installation in which a waterproof fastener is desirable. While describing this specific installation, I desire it understood that the use of this invention is not limited to the specific installation described, but will be readily applicable to other types of installations.

Indicated at 10 is the upper surface of a hull portion of a flying boat. This surface is frequently referred to as the outer skin and is constructed generally from sheet aluminum or other metals, or plywood, plastics, etc.

A removable inspection plate 11 likewise formed of similar sheet material is adapted to be placed in an opening in the outer skin and to lie flush therewith.

Riveted to the under side of the skin by rivets 12 and extending into the outer skin opening, thereby forming a flange 13 on which plate 11 may be positioned, is, for example, a metal sheet 14 having a central opening 15. Secured in any suitable manner to the plate 11 is the rotatable stud assembly generally referred to as 16 while secured to the flange 13 is the socket portion of the new fastener generally referred to as 17.

As illustrated, the stud assembly structure 16 comprises a spring retainer cup 18 secured in any suitable manner to the sheet 11 and formed at its bottom with an inwardly extending flange 19 having a central opening through which the rotatable stud 20 passes. A spring 35 is positioned between the flange 19 and the under side of the stud head 21. The opposite end of the stud is formed with a cross pin 22.

The socket portion 17 of this sealed fastener is formed generally in two parts. One part is the part formed to receive and secure the stud against rotation and is therefore called the stud engaging part 17a, while the other part is a covering 25 to frictionally fit the stud engaging part and to thereby form a complete covering for it. This two part socket, in addition to its sealed character, thus providing a liquid and gaseous seal, serves as well to keep the stud free from dirt or foreign matter which might normally interfere with the free and ready operation of the fastener.

In the form illustrated, the sealed socket portion or cam collar 17 is secured in any suitable manner to the flange 13. As shown in Fig. 2, the flange is formed with an opening 9 which receives the cam collar, the latter having a central opening for receiving the spring retainer 18 as well as an opening through which the stud and cross pin 22 may pass, and a cam surface 23 having a hard wear resistant covering 23a adapted to cooperate with said cross pin and guide said cross pin to a retaining detent upon rotation of the stud. A socket portion 17, as shown, is secured to the sheet or flange 13 by means of flanging over the skirt 17b, and thus compressing the serrations 17c against the under side of the flange 13.

The wear-resistant covering 23a, which forms no part of the present invention, may be formed from sheet material which is preferably harder than the metal from which the main body of the cam collar 17 is formed. In actual practice, this wear-resistant covering is first preformed by a metal stamping operation, after which the main body of the cam collar is formed within the wear-resistant covering by means of a die-stamping operation.

In order to prevent rotation between the covering and the main body of the cam collar, a small opening is left in the wall of the wear-resistant covering, and in the ensuing die-stamping operation metal is forced through such opening to form a portion 8 which projects through such opening in the covering. The upper edge 7 of the wear-resistant covering is preferably curved, as shown in Fig. 3. For the purpose of guiding the cross-pin into the opening, the walls of the bore in the socket 17 are formed with arcuately-shaped guideways 6.

The stud engaging part of said socket or cam collar is formed on its outer side surface, preferably circular in shape, with an outwardly extending flange or shoulder 24 which, as shown, may take an outward, angularly disposed position.

The other part of said new, waterproof socket portion is a pre-formed generally cup shaped covering or female member 25 made of metal, plastic, or other suitable material, and having inside dimensions whereby it cooperates and has a sliding sealing frictional engagement with the outer surface 26 of the stud engaging part of the preformed socket 17. This covering is preferably formed with a flange portion 27 angularly disposed with reference to the main body portion 28, said flange adapted to contact the shoulder 24 and to act as a lead in surface when applying the cap 25 to the socket 17. It is preferred to form the angle of the flange 27 similar to that of the shoulder 24 thereby providing a face-to-face cooperating seal contact between said two surfaces, thus securing a water-tight seal between the parts.

Further, said flange 27, in cooperation with the shoulder 24, provides a stop limiting the distance to which said covering may be pushed on said stud engaging portion. Such an automatic stop 27 is important in view of the fact that the proper space 30 must be provided between the end of the stud 29 and the bottom 31 of the covering so that no interference with the operation of the fastener occurs.

The inner angularly disposed surface of the flange 27 is also provided so that during the application of the covering it acts as a self aligning lead-in for quick assembly of the two parts of the socket. By thus providing a guiding surface, efficient and rapid installation is possible.

While in some installations the frictional fit of the two piece waterproof socket may be sufficient securing of the parts in place, in certain installations it has been found desirable to utilize a sealing compound. The type of sealing compound or adhesive used depends upon the material from which the waterproof socket is fabricated and the substance which the seal is intended to contain as well as other factors.

In practice the sealing compound is applied as shown at 33 in Fig. 4 to some portion of the inside area of the cup. Then as the cup is slipped on a seal is effected through a considerable area of the adjacent side walls of the cup and socket.

It is obvious from the above description that in any installation similar to that shown in Fig. 1, the openings are completely sealed. Of course, it may be desirable to place a suitable gasket 32 between the plate 11 and the flange 13. The gasket may be of any suitable material such as rubber, fiber, or the like.

The new socket additionally serves, where desired, to hold a waterproof grease or other compound and may, if desired, be filled to a level whereby the entire space between the two parts of the socket is filled. This prevents condensation or water from forming in the bottom of the socket and additionally serves as a lubricant permitting easy rotation of the stud.

Again, it is desired to point out that while this invention has been shown as applicable to a specific fastener, it may have equal application to fasteners of varying construction and, accordingly, it is desired that the invention be limited solely as required by the appended claims.

I claim:

1. In a fastener for securing a plurality of substantially flat plates together in substantially fluid-tight surface engagement, and having a rotatable stud assembly carried by one of the plates and formed with a shank to draw and hold the plates together in sealed relationship, the combination of an apertured socket member carried by the other plate and having sealing engagement therewith and a sealing cover carried by the socket member, the external surface of the socket member being of generally cylindrical contour, the sealing cover being a thin-walled, generally cylindrical structure provided with a closed end and also having an open end which receives the external cylindrical surface of the socket member, the internal contour of such sealing cover being shaped complemental to said external cylindrical surface and being of such dimensions relative to such surface as to closely fit the same with a firm, frictional engagement, the cooperating cylindrical surfaces having substantially fluid-tight sealing interengagement.

2. In a fastener for securing a plurality of substantially flat plates together in substantially fluid-tight surface engagement, and having a rotatable stud assembly carried by one of the plates and formed with a shank to draw and hold the plates together in sealed relationship, the combination of an apertured socket member carried by the other plate and having sealing engagement therewith and a sealing cover carried by the socket member, the external surface of the socket member being of generally cylindrical contour and being formed at its upper end with an outwardly-projecting, annular shoulder, the sealing cover being a thin-walled, generally cylindrical structure provided with a closed end and also having an open end which receives the external cylindrical surface of the socket member, the internal contour of such sealing cover being shaped complemental to said external cylindrical surface and being of such dimensions relative to such surface as to closely fit the same with a firm, frictional engagement, the open end of the structure being formed with an outwardly-flared, annular flange shaped complemental to the annular shoulder and having sealing engagement with the surface of such shoulder.

3. In a fastener for securing a plurality of substantially flat plates together in substantially fluid-tight surface engagement, and having a rotatable stud assembly carried by one of the plates and formed with a shank to draw and hold the plates together in sealed relationship, the combination of an apertured socket member carried by the other plate and having sealing engagement therewith and a sealing cover carried by the socket member, the external surface of the socket member being of generally cylindrical contour, the sealing cover being a thin-walled, generally cylindrical member provided with a closed end and also having an open end which receives the external cylindrical surface of the socket member, the internal contour of such sealing cover being shaped complemental to said external cylindrical surface and being of such dimensions relative to such surface as to closely fit the same with a firm, frictional engagement, and a sealing compound interposed between the cooperating cylindrical surfaces.

J MILLS SUMMERS.